(12) United States Patent
Masuda et al.

(10) Patent No.: US 10,951,486 B2
(45) Date of Patent: Mar. 16, 2021

(54) TERMINAL DEVICE, UI EXPANSION METHOD, AND UI EXPANSION PROGRAM

(71) Applicant: NIPPON TELEGRAPH AND TELEPHONE CORPORATION, Tokyo (JP)

(72) Inventors: Takeshi Masuda, Yokosuka (JP); Kenichi Nishikawa, Yokosuka (JP); Hiroyuki Adachi, Yokosuka (JP); Akira Inoue, Yokosuka (JP); Sayaka Yagi, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/640,064

(22) PCT Filed: Aug. 6, 2018

(86) PCT No.: PCT/JP2018/029466
§ 371 (c)(1),
(2) Date: Feb. 19, 2020

(87) PCT Pub. No.: WO2019/039255
PCT Pub. Date: Feb. 28, 2019

(65) Prior Publication Data
US 2020/0204458 A1 Jun. 25, 2020

(30) Foreign Application Priority Data
Aug. 23, 2017 (JP) .............................. JP2017-160393

(51) Int. Cl.
*G06F 3/0484* (2013.01)
*H04L 12/24* (2006.01)
(Continued)

(52) U.S. Cl.
CPC .......... *H04L 41/22* (2013.01); *G06F 3/04847* (2013.01); *G06F 8/38* (2013.01); *G06F 16/958* (2019.01); *H04L 67/02* (2013.01)

(58) Field of Classification Search
CPC ....................................................... H04L 41/22
(Continued)

(56) References Cited

U.S. PATENT DOCUMENTS 8,205,169 B1 * 6/2012 Donohoe .............. G06F 3/0481
715/790
8,760,674 B2 * 6/2014 Snyder ............... H04N 1/00424
358/1.13
(Continued)

FOREIGN PATENT DOCUMENTS

JP 2009-181329 A 8/2009
JP 2016-110206 A 6/2016

OTHER PUBLICATIONS

International Search Report and Written Opinion dated Sep. 18, 2018 for PCT/JP2018/029466 filed on Aug. 6, 2018, 9 pages including English Translation of the International Search Report.
(Continued)

*Primary Examiner* — Reza Nabi
(74) *Attorney, Agent, or Firm* — Xsensus LLP (57) ABSTRACT

A part specifying unit causes a web browser to display a part specification GUI that enables to specify settings relating to a display mode of a part constituting a web page, and accepts specification of settings relating to a display mode through the part specification GUI. Moreover, an action specifying unit causes the web browser to display an action specification GUI that enables to specify settings relating to an action of a part constituting a web page, and accepts specification of settings relating to an action through the action specification GUI. An expanding unit expands the web page based on the settings relating to the display mode accepted by the
(Continued)

part specifying unit, and on the settings relating to the action accepted by the action specifying unit, and displays the expanded web page on the web browser.

7 Claims, 9 Drawing Sheets

(51) Int. Cl.
*G06F 16/958* (2019.01)
*G06F 8/38* (2018.01)
*H04L 29/08* (2006.01)

(58) Field of Classification Search
USPC .......................................................... 715/735
See application file for complete search history.

(56) References Cited

U.S. PATENT DOCUMENTS

| | | | | |
|---|---|---|---|---|
| 9,058,312 | B2* | 6/2015 | Backlund | G06F 40/14 |
| 9,123,002 | B2* | 9/2015 | Shikhman | G06Q 10/06 |
| 9,760,381 | B2* | 9/2017 | Kumar | G06F 8/656 |
| 9,977,422 | B2* | 5/2018 | Steele | G05B 19/4065 |
| 10,075,140 | B1* | 9/2018 | Dietrich | H03G 3/02 |
| 10,157,046 | B2* | 12/2018 | Abraham | G06F 8/38 |
| 2002/0116417 | A1* | 8/2002 | Weinberg | G06F 16/30 715/212 |
| 2002/0147748 | A1* | 10/2002 | Huang | G06F 40/16 715/235 |
| 2003/0120686 | A1* | 6/2003 | Kim | G06F 40/14 |
| 2005/0039108 | A1* | 2/2005 | Hudson | G06F 40/166 715/234 |
| 2007/0124346 | A1* | 5/2007 | Mitchel | G06Q 10/06 |
| 2010/0333064 | A1* | 12/2010 | Hattori | G06F 8/20 717/106 |
| 2014/0380229 | A1* | 12/2014 | Volodin | G06F 3/0482 715/780 |
| 2016/0062963 | A1* | 3/2016 | Umapathy | G06F 40/14 715/760 |
| 2016/0380915 | A1* | 12/2016 | Umapathy | G06F 9/451 709/226 |
| 2017/0249287 | A1* | 8/2017 | Thayer | G06F 40/226 |
| 2017/0308278 | A1* | 10/2017 | Coble | G06F 8/38 |
| 2018/0336866 | A1* | 11/2018 | Triverio | G09G 5/10 |
| 2020/0204458 | A1* | 6/2020 | Masuda | G06F 3/04847 |

OTHER PUBLICATIONS

"Google Blockly," Google Developers, Retrieved from the Internet URL: https://developers.google.com/blockly/, on Jul. 5, 2017, pp. 1-4.

Hotta, K., et al., "Application Case Study of Client Autonomous Manipulation Agent," 2009 IEICE Society Conference, B-14-17, Sep. 2009, pp. 348 (see Partial Translation).

Maloney, J., et al., "The Scratch Programming Language and Environment," ACM Transactions on Computing Education, vol. 10, No. 4, Article 16, Nov. 2010, pp. 1-15.

Nishikawa, K., et al., "A Method for Attaching Additional Functionalities onto Web-based OSS User Interfaces," IEICE Technical Report, vol. 116, No. 124, ICM2016-19, Jul. 2016, pp. 63-68.

Nozue, H., et al., "Scenario Generation Method by GUI Operation in Client Autonomous Manipulation Agent," 2009 IEICE Society Conference, B-14-16, Sep. 2009, pp. 347 (see Partial Translation).

* cited by examiner

| URL | PART SPECIFICATION | | | | | | | ACTION SPECIFICATION |
|---|---|---|---|---|---|---|---|---|
| | ELEMENT | OFFSET | LABEL | BACK-GROUND COLOR | FORE-GROUND COLOR | ... | ANNOTATION | |
| https://example.net/moshikomi | textbox_02 | (100,150) | CUSTOMER NAME | WHITE | BLACK | ... | INPUT IN FULL SIZE | function check_... |
| https://example.net/moshikomi | button_01 | (250,400) | REGISTRA-TION | WHITE | BLACK | ... | | function click_... |
| ... | | | | | | | | |

TERMINAL DEVICE, UI EXPANSION METHOD, AND UI EXPANSION PROGRAM

CROSS-REFERENCE TO RELATED APPLICATIONS

The present application is based on PCT filing PCT/JP2018/029466, filed Aug. 6, 2018, which claims priority to JP 2017-160393, filed Aug. 23, 2017, the entire contents of each are incorporated herein by reference.

FIELD

The present invention relates to a terminal device, a UI expansion method, and a UI expansion program.

BACKGROUND

In system development, works such as definition of requirements, design, coding, and test are necessary, and often requires a great amount of development cost and time for the respective works. For this, a technique of performing the respective works particularly relating to expansion of a user interface (UI) easily has conventionally been known.

For example, an integrated development environment (IDE) that enables to perform configuration and implementation relating to a display mode of the UI visually has been known. Moreover, for example, a method of describing an expansion rule in JSON format or JavaScript (registered trademark) language that is enabled to be edited by using a text editor or the like has been known (for example, refer to Non Patent Literature 1).

CITATION LIST

Non Patent Literature

Non Patent Literature 1: NISHIKAWA, Kenichi, MASUDA, Takeshi, ADACHI, Hiroyuki, TSUCHIKAWA, Kimio, INOUE, Akira, MARUYAMA, Tsutomu (July, 2016) "A Method for Attaching Additional Functionalities onto Web-based OSS User Interfaces", *IEICE Technical Report*, Vol. 116, no. 124, ICM2016-19, pp. 63-68

Non Patent Literature 2: Google Blockly, [online], [searched on Jul. 5, 2017], the Internet (http://develpers-.google. Com/blockly/)

Non Patent Literature 3: MALONEY, John, RESNICK, Mitchel, RUSK, Natalie, SILVERMAN, Brian, and EASTMOND, Evelyn (November, 2010) "The Scratch Programming Language and Environment", *ACM Transactions on Computing Education*, Vol. 10, No. 4, Article 16

Non Patent Literature 4: NOSUE, Haruhisa, YOKOSE, Fumihiro, MASUDA, Takeshi, "Scenario Generation Method by GUI Operation in Client Autonomous Manipulation Agent", 2009 IEICE Society Conference, B-14-16

Non Patent Literature 5: HOTTA, Kentaro, NISHIKAWA, Kenichi, MASUDA, Takeshi, "Application Case Study of Client Autonomous Manipulation Agent", 2009 IEICE Society Conference, B-14-17

SUMMARY

Technical Problem

However, when the works relating to expansion of a UI is to be performed by using a conventional technique, skills and knowledges about programming can be necessary. Therefore, the conventional techniques have a problem that the works relating to expansion of a UI can be difficult for those not having skills and knowledges about programming.

For example, in the conventional IDE, implementation of an action with respect to an event of an UI cannot be performed visually. Accordingly, to perform such implementation of an action, description by a normal programming language is to be required. Therefore, for those not having programming skills, it is difficult to perform the implementation of an action with respect to an event of the UI by using the conventional IDE.

Moreover, for example, when edition of an expansion rule is to be performed by using the technique described in Non Patent Literature 1, at least knowledge about JSON format or JavaScript language is necessary. Therefore, for those not having knowledge about JSON format or JavaScript language, it is difficult to perform edition of an expansion rule by using the technique described in Non Patent Literature 1.

Solution to Problem

To solve a problem and to achieve an object, a terminal device includes: a part specifying unit that causes the terminal device to display a first graphical user interface (GUI) that enables to specify settings relating to a display mode of a part constituting a web page, and that accepts specification of settings relating to the display mode through the first GUI; an action specifying unit that causes the terminal device to display a second GUI that enables to specify settings relating to an action of a part constituting the web page, and that accepts specification of settings relating to the action through the second GUI; and an expanding unit that expands the web page based on the settings relating to the display mode accepted by the part specifying unit, and the settings relating to the action accepted by the action specifying unit, and that causes the terminal device to display the expanded web page.

Advantageous Effects of Invention

According to the present invention, those not having skills and knowledges about programming can perform works relating to expansion of a UI.

DESCRIPTION OF EMBODIMENTS

Hereinafter, embodiments of a terminal device, a UI expansion method, and a UI expansion program according to the present application will be described in detail with reference to the drawings. The present invention is not limited to the embodiments described in the following.

Configuration of First Embodiment

Figure 1:
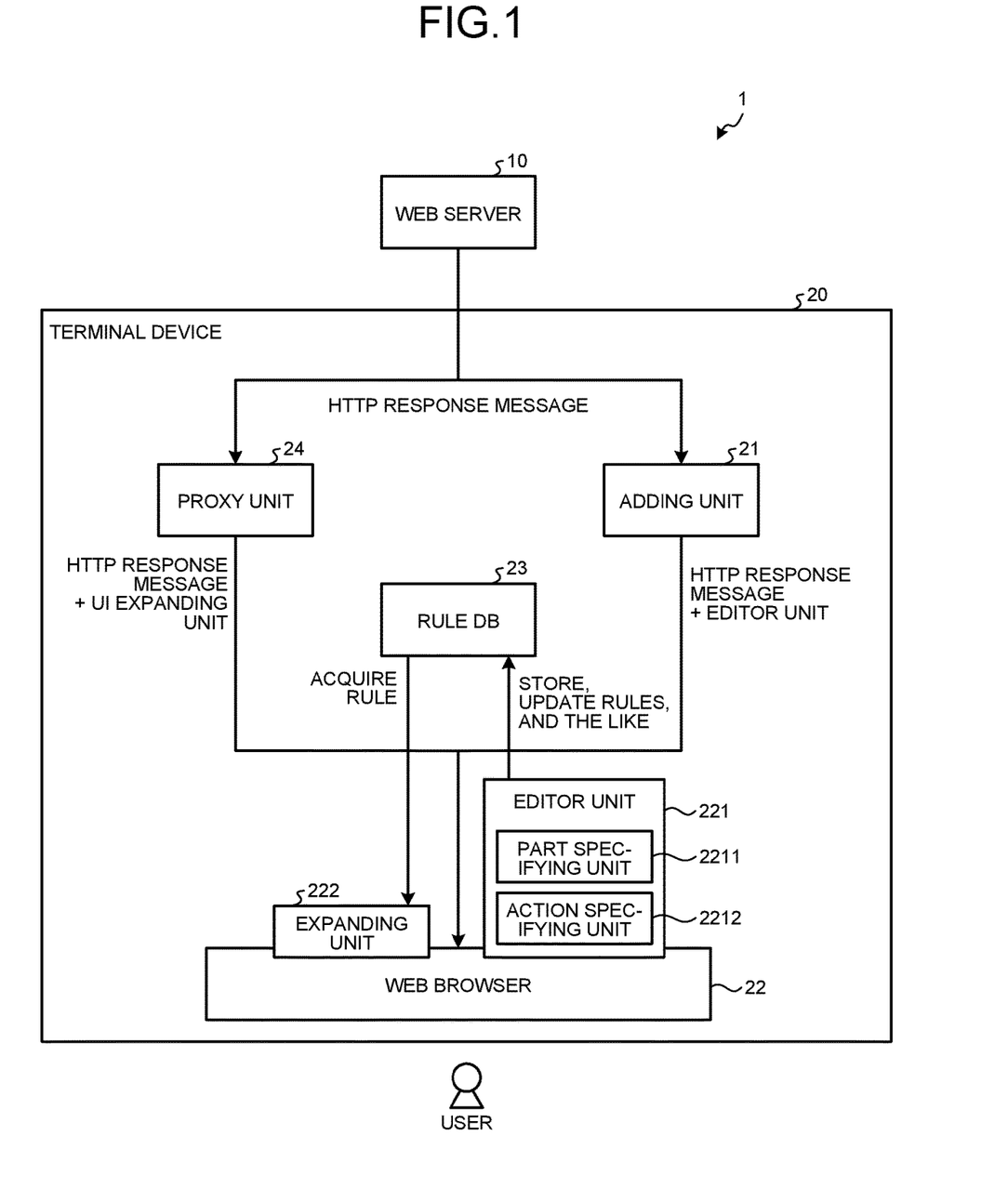
FIG. 1 is an illustration of an example of a configuration of a UI expansion system that includes a terminal device according to a first embodiment.

First, a configuration of a UI expansion system and a terminal device according to the first embodiment will be described, using FIG. 1. FIG. 1 is an illustration of an example of a configuration of the UI expansion system that includes the terminal device according to a first embodiment. As illustrated in FIG. 1, a UI expansion system 1 includes a web server 10 and a terminal device 20.

Moreover, the terminal device 20 includes an adding unit 21, a web browser 22, a rule DB 23, a proxy unit 24, an editor unit 221, an expanding unit 222, a part specifying unit 2211, and an action specifying unit 2212. The terminal device 20 transmits a request message including a URL and the like to the web server 10, and displays a web page on the web browser 22 based on a response message transmitted from the web server 10 in response to the request message.

Furthermore, the adding unit 21, the rule DB 23, and the proxy unit 24 may be arranged in a device other than the terminal device 20, such as the web server 10. Particularly, the adding unit 21 and the proxy unit 24 may be arranged in a proxy server of a forward proxy type or a reverse proxy type. Moreover, the adding unit 21 and the proxy unit 24 may be implemented as an add-on function of the web browser 22.

The adding unit 21 acquires a response message transmitted from the web server 10 to the terminal device 20 in response to the request message transmitted from the terminal device 20 to the web server 10, and adds a code of a program to cause the terminal device 20 to perform functions of the part specifying unit 2211 and the action specifying unit 2212 to the response message.

For example, the adding unit 21 adds a code described in a scrip language, such as JavaScript, that can be interpreted and executed in the web browser 22 to a BODY part or the like of HTML of the acquired response message, and returns it to the web browser 22. The web browser 22 then interprets the added code, and performs the function of the editor unit 221. Note that the function of the editor unit 221 includes the functions of the part specifying unit 2211 and the action specifying unit 2212.

Figure 2:
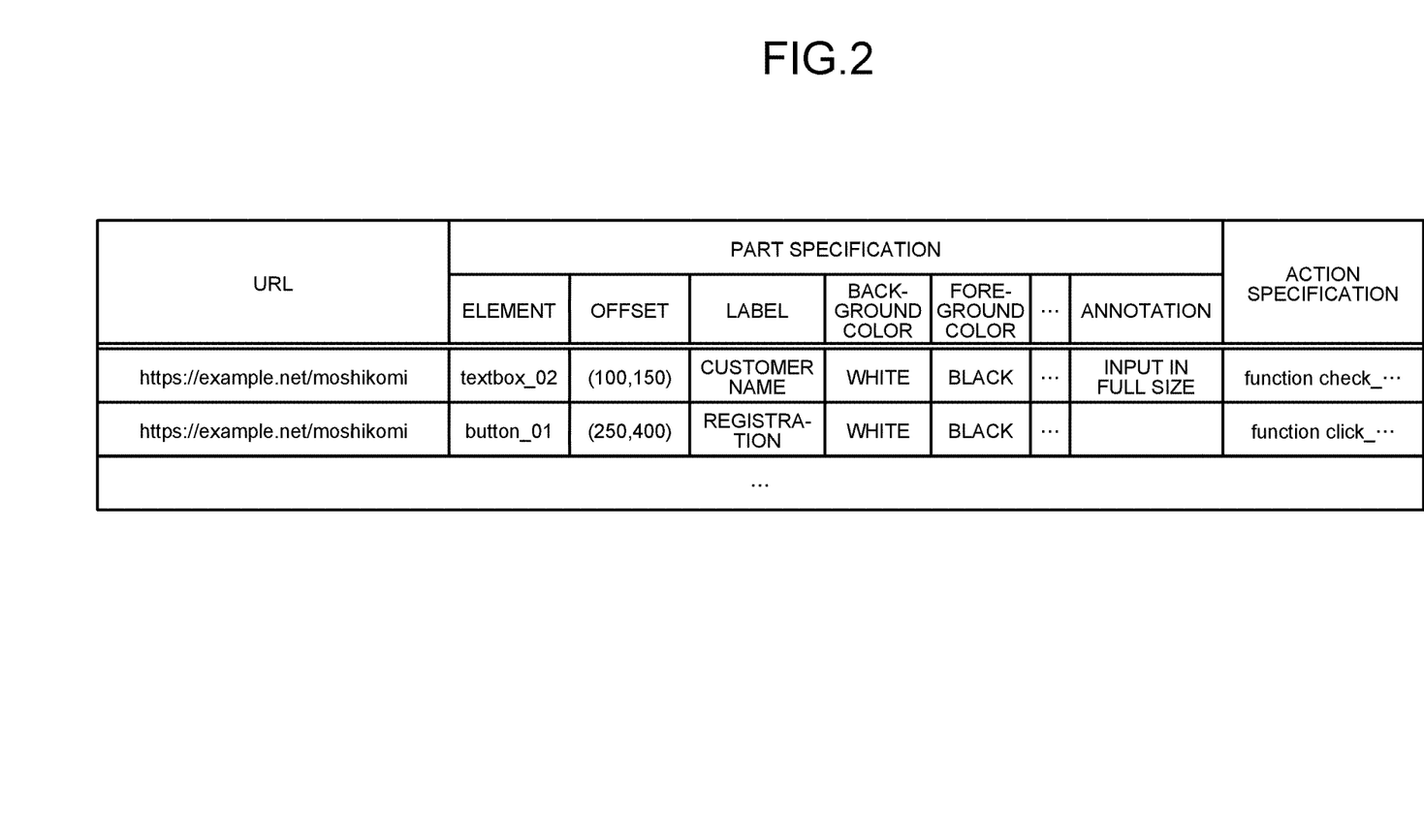
FIG. 2 is an illustration of an example of a data structure of a rule DB according to the first embodiment.

The rule DB 23 stores settings accepted by respective parts of the editor unit 221. Details of settings will be described later. FIG. 2 is an illustration of an example of a data structure of the rule DB according to the first embodiment.

As illustrated in FIG. 2, the rule DB 23 stores various kinds of settings, associating with URLs. Furthermore, in the rule DB 23, the settings are classified into those included in part specification and those included in action specification. The settings included in the part specification include, for example, element, offset, label, background color, foreground color, and annotation. The settings included in the action specification include, for example, a code of a program described in a script language. In this example, the element is information to identify a part constituting a web page.

In the example in FIG. 2, the rule DB 23 stores "(100, 150)", "customer name", "white", "black", "input in full size" as an offset, a label, a background color, a foreground color, and an annotation of an element "textbox_02" of a URL https://example.net/moshikomi, respectively. Moreover, in the example in FIG. 2, the rule DB 23 stores "function check_ . . . " as a code of a program expressing an action of the element "textbox_02" of the URL https://example.net/moshikomi.

Furthermore, in the example in FIG. 2, the rule DB 23 stores "(250, 400)", "registration", "white", and "black" as the offset, the label, the background color, and the foreground color of an element "button_01" of the URL "https://example.net/moshikomi", respectively. Moreover, in the example in FIG. 2, the rule DB 23 stores "function click_ . . . " as a code of a program that expresses an action of the element "button_01" of the URL https://example.net/moshikomi.

The proxy unit 24 acquires the response message transmitted from the web server 10 to the terminal device 20 in response to the request message transmitted from the terminal device 20 to the web server 10, similarly to the adding unit 21. The proxy unit 24 then adds a code of a program to cause the terminal device 20 to perform a function of the expanding unit 222, to the response message. Furthermore, the proxy unit 24 may be configured to add a code to the response message when an URL included in the request message matches with a URL stored in the rule DB 23.

Figure 3:
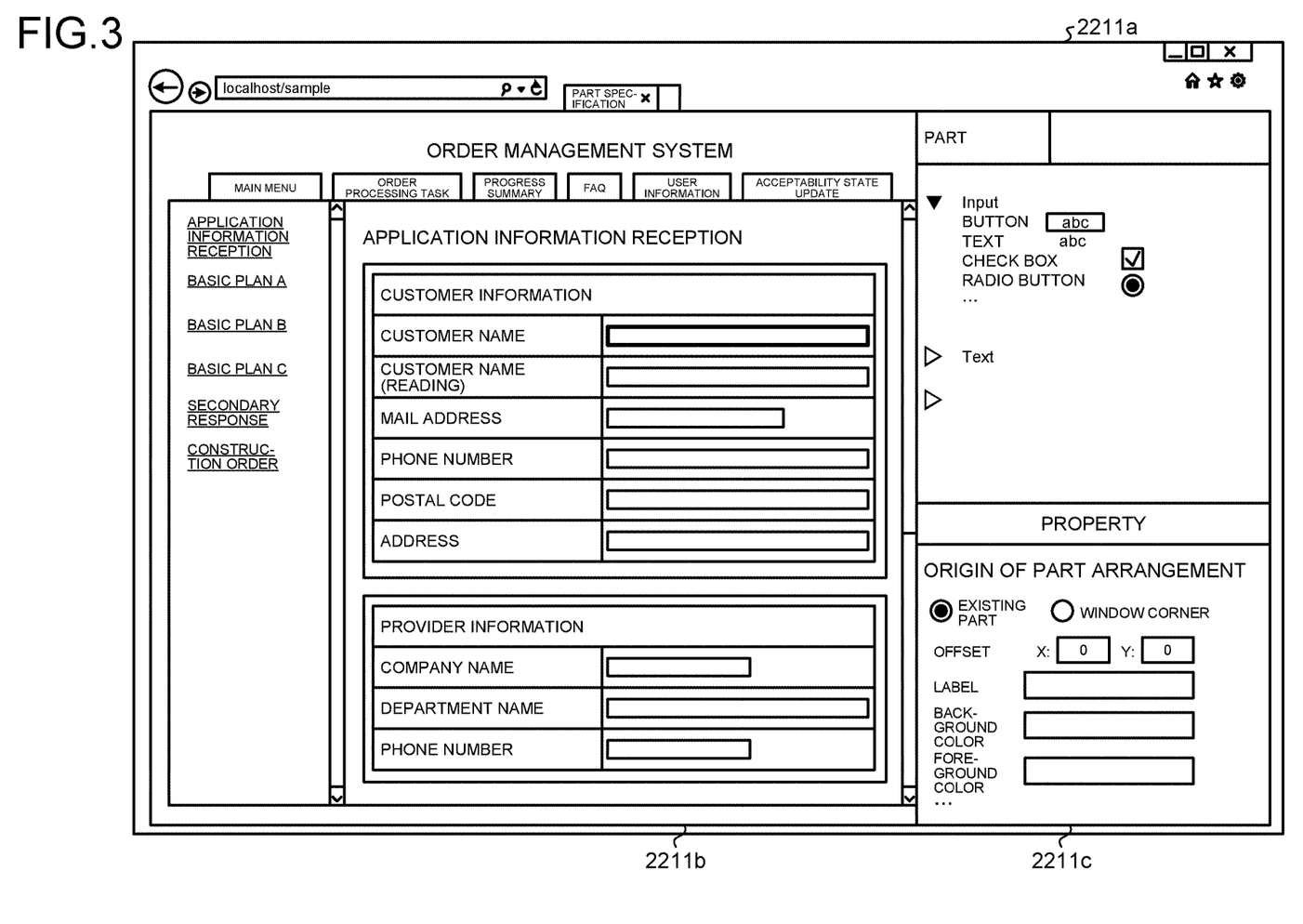
FIG. 3 is an illustration of an example of a part specification GUI according to the first embodiment.

The part specifying unit 2211 causes the web browser 22 to display a part specification GUI 2211a that enables to specify a setting relating to a display mode of a part constituting the web page, and accepts a specification of setting relating to a display mode through the part specification GUI 2211a. The part specification GUI 2211a is an example of a first GUI.

FIG. 3 is an illustration of an example of the part specification GUI according to the first embodiment. As illustrated in FIG. 3, the part specification GUI 2211a is a GUI that enables to specify setting relating to a display mode of respective user interface parts. The part specifying unit 2211 displays the web page or a captured image of the web page so as to serve also as background information of arrangement work in an interactive editing operation of a user in the part specification GUI 2211a. For example, the part specifying unit 2211 may display the part specification GUI 2211a on a layer superimposed on the web page, or a captured image of the web page.

Specifically, in the example in FIG. 3, a screen of the part specification GUI 2211a includes a reference panel 2211b and a setting panel 2211c. The reference panel 2211b is generated based on an existing system screen subject to setting. Moreover, the setting panel 2211c is a setting panel specific to an editor to perform setting operation. In FIG. 3, a web page in which a title label "order management system" is arranged at an upper part is displayed in the reference panel 2211b.

The user interface part is an object constituting the web page, such as a text box, a button, a check box, and a label. Moreover, in the following description, the user interface part may be indicated as part simply.

The part specifying unit 2211 accepts specification of setting about the position, the color, the label, and the annotation of respective parts, for example, through the part specification GUI 2211a. As illustrated in FIG. 3, from the part specification GUI 2211a, a type of a part, such as button, text, and check box, can be specified. Furthermore, from the part specification GUI 2211a, an origin of part arrangement, numeric values of X and Y of the offset, text to be display in the label, the background color, the foreground color, and the like can be specified.

The respective settings will be described herein, taking a case in which a part is added as the part specification GUI 2211a is operated as an example. First, when "existing part"

is selected as a part arrangement mode (origin of part arrangement), the offset of a position of an added part is to be determined based on the position of the part already arranged on the web page as the origin.

Selection of "existing part" corresponds to, for example, a state in which a text field of "customer name" in the reference panel 2211b is displayed in a highlighted manner in FIG. 3. This can be achieved by a processing method of comparing with rectangle coordinates of all existing parts internally held, triggered by a direct click on the relevant position on the web page itself or on the captured image thereof by the user in a previous moment before turning into the state, or the like.

On the other hand, when "window corner" is selected as a part arrangement mode, the offset of a position of the added part is to be determined based on an upper left, a lower left, an upper right, or a lower right corner of the window as an origin. Moreover, the offset expresses a position of the added part in an X-axis direction and a Y-axis direction relative to the origin by the number of pixels.

The part specifying unit 2211 may be enabled to specify a center point of an existing part or a window frame as an origin of the part arrangement. Moreover, the part specifying unit 2211 may be enabled to specify an X direction and a Y direction in a boundary rectangle of an existing part or a window frame as an origin of the part arrangement. It may be enabled to specify not only a center point but also a dividing point at a predetermined ratio (for example, a dividing point of 20% in the X direction: 80% in the Y direction, or the like).

Moreover, the part specifying unit 2211 displays a list of parts that are registered in a library in advance, and that can be expressed by HTML on the part specification GUI 2211a, as addable types of parts. When one of the displayed addable types of parts is selected, the selected type of part is displayed on the part specification GUI 2211a. At this time, a position at which the part is displayed is a position based on the origin and the offset specified.

Furthermore, if offset settings are changed in the setting panel 2211c, it is reflected in the display of the reference panel 2211b promptly. Moreover, by adjusting the arrangement by directly moving the part by mouse drugging in the reference panel 2211b, offset coordinate values thereof are reflected in the settings of the setting panel 2211c. As described, by providing an interactive editing means, the user can change and review the arrangement intuitively and visually. That is, the user can perform an interactive editing operation with respect to the part specification GUI 2211a. At this time, the web page in the part specification GUI 2211a is displayed as the background information of the arrangement work.

If a configuration in which a web page is not a captured image but an actual entity that actually works, original actions of the web page can be obtained also. Thus, even for a dynamic web page configuration, that is, a page in which presence or absence of an existing part or position coordinates change in the wake of selection of a tab or selection of a link, the user is not necessary to newly learn a special editing operation in the part specification GUI 2211a. The special editing operation is an editing operation, such as a recapturing work, management when plural pieces of captured image are held, search and selection of captured data that can be reused as a subject to edition therefrom. On the other hand, when it is attempted to implement these special editing functions, a technically difficult problem, such as that it does not work properly unless an internal structure of an existing web page is within a range assumed in advance, is likely to occur. By displaying an actual web page also serving as background information of the arrangement work, such a technical problem can be fundamentally avoided.

When the respective settings are specified, the part specifying unit 2211 stores the specified settings in the rule DB 23. At this time, when settings relating to an existing part of the web page are not stored in the rule DB 23, the part specifying unit 2211 stores entire settings relating to the existing part in the rule DB 23. Moreover, when settings stored in the rule DB 23 are changed by operation of the part specification GUI 2211a, the part specifying unit 2211 updates the rule DB 23.

Figure 4:
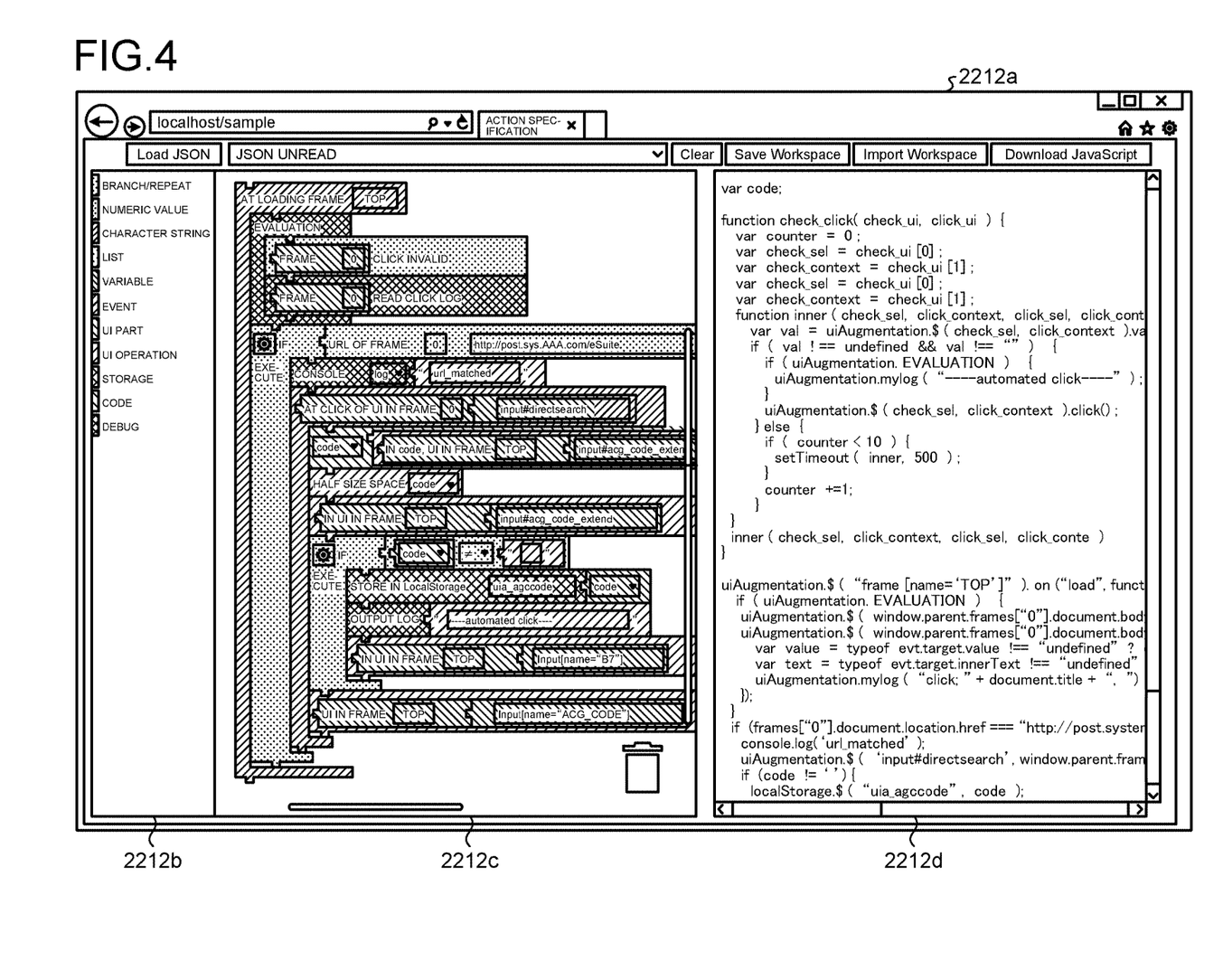
FIG. 4 is an illustration of an action specification GUI according to the first embodiment.

The action specifying unit 2212 causes the web browser 22 to display an action specification GUI 2212a that enables to specify a setting relating to an action of a part constituting a web page, and accepts a specification of setting relating to an action through the action specification GUI 2212a. The action specification GUI 2212a is an example of the second GUI.

FIG. 4 is an illustration of the action specification GUI according to the first embodiment. As illustrated in FIG. 4, the action specifying unit 2212 displays the action specification GUI 2212a that enables to specify setting relating to an action by combining blocks corresponding to predetermined logics. The action specification GUI 2212a may be implemented by an existing visual programming library (for example, refer to Non Patent Literature 2).

As illustrated in FIG. 4, in an item display panel 2212b of the action specification GUI 2212a, items indicating categories of logics, such as "branch/repeat" and "numeric value" are displayed. When either item is clicked, a block corresponding to a logic included in the clicked item is displayed in the action specification GUI 2212a. The user can select an arbitrary block from among blocks displayed in the action specification GUI 2212a, to arrange in a block arrangement panel 2212c. At this time, the user can arrange blocks by drug and drop with a mouse.

The logics corresponding to blocks include "start processing at loading frame XXX", "if XXX=XXX, start processing", "combine character string XXX and character string XXX", "add numeric value XXX to numeric value XXX", "input character string XXX in text box XXX", and the like. Note that XXX herein indicates that an arbitrary value can be set at the time of arrangement of a block.

Moreover, the action specifying unit 2212 generates a code based on the logic corresponding to the block and the arrangement of the block by the user, and displays the generated code in a code display panel 2212d on a right side of the action specification GUI 2212a.

For example, the action specifying unit 2212 generates a code such that a logic corresponding to a block arranged on an upper side is performed prior to a logic corresponding to a block arranged on a lower side. Moreover, for example, the action specifying unit 2212 generates a code, when a block arranged to be included in a block corresponding to a predetermined branch-condition determining logic is present, such that a logic corresponding to the block arranged to be included is performed when a branch condition is satisfied.

When a URL of the web page subject to action specification matches with a URL stored in the rule DB 23, the action specifying unit 2212 acquires settings of an action specification corresponding to the URL, that is, a code of a program described in a script language from the rule DB 23. Furthermore, the acquired code of the program expressed in combination of blocks is displayed in the action specification GUI 2212a. Moreover, when it is newly generated, the action specifying unit 2212 displays a code of the program set as a null code or a default expressed in combination of blocks in the action specification GUI 2212a.

When combination of blocks is made by the user, the action specifying unit 2212 generates a code described in, for example, JavaScript based on the combination of blocks. The action specifying unit 2212 then stores the generated code in the rule DB 23.

Moreover, at this time, the action specifying unit 2212 may store data expressing the combination of blocks in a predetermined format in the rule DB 23 along with the code. As a method of expressing the combination of blocks in a predetermined format, the action specifying unit 2212 may use a general conversion method in which relationships and attributes are held as information when the blocks are regarded as objects according to an existing standard, such as XML format and JSON format.

The expanding unit 222 expands the web page based on the settings relating to the display mode accepted by the part specifying unit 2211, and on the settings relating to the action accepted by the action specifying unit 2212, and causes the web browser 22 to display the expanded web page. The expanding unit 222 can acquire the respective settings from the rule DB 23. Therefore, in the present embodiment, expansion of the UI is enabled without adding a modification to the web server 10 that is the source of the web page. Therefore, according to the present embodiment, a problem occurring at the time when modifications are added to an existing system, such as that the system after modification cannot be restored to its original form is solved. Furthermore, a substantial increase of system modification cost and a load of a medium to long term maintenance can be reduced that are caused when variations of UI increase as a result of localization according to a request of each department that uses an existing system, improvement according to a skill of a user using it or a work scene faced, and the like.

Figure 5:
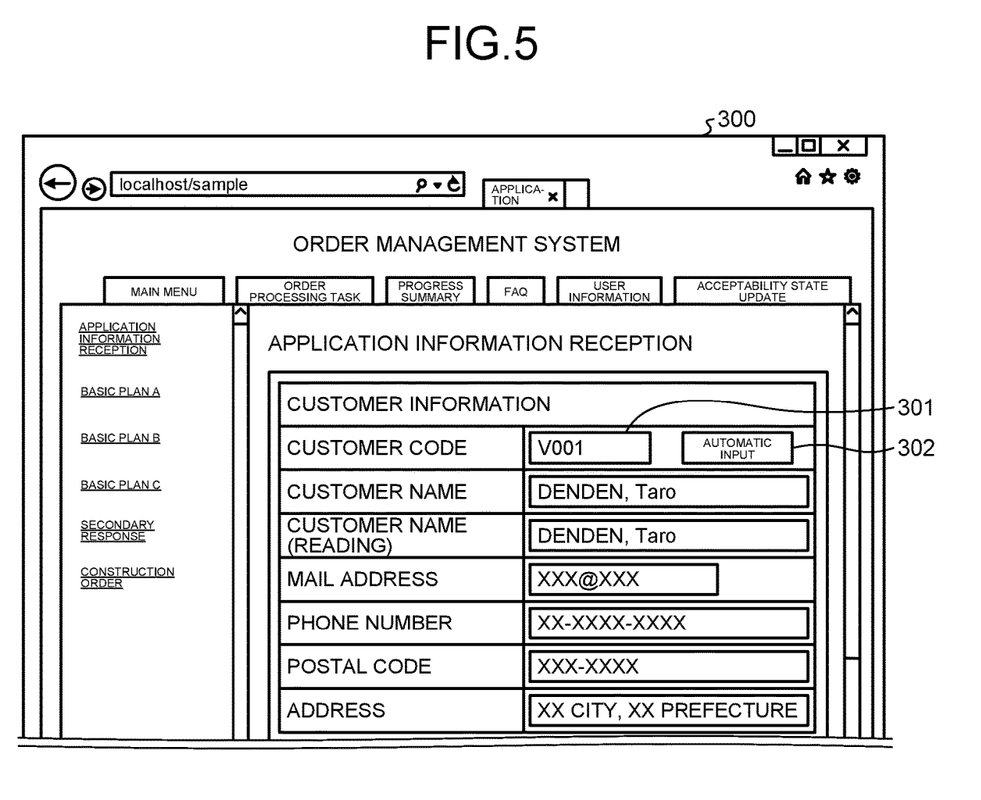
FIG. 5 is an illustration of an example of an expanded web page according to the first embodiment.

FIG. 5 is an illustration of an example of an expanded web page according to the first embodiment. The expanding unit 222 causes the web browser 22 to display an expanded web page 300. Moreover, the expanding unit 222 displays a text box 301 in which a label "customer code" is added, and an automatic input button 302 on the expanded web page 300.

The text box 301 and the automatic input button 302 are parts that are added by the part specifying unit 2211, and the actions of which are set by the action specifying unit 2212. That is, in a BODY part of HTML of the expanded web page 300, an element indicating the text box 301, an element indicating the automatic input button 302, and a code of a program that is executed when the automatic input button 302 is operated are added by the expanding unit 222.

When the automatic input button 302 is clicked in a state in which a value is input in the text box 301, the web browser 22 performs automatic input processing according to the added code. Suppose that customer information is stored, using the customer code as a key, in a predetermined DB enabled to be referred to by the web browser 22. Moreover, suppose that the customer information includes a name in kanji, a name in kana, a mail address, a phone number, a postal code, an address, and the like.

For example, in the automatic input processing, the web browser 22 acquires the customer information from the DB using a customer code "V001" as a key, and inputs the acquired customer information in the text box. For example, the web browser 22 inputs "DENDEN, Taro" in a text box to which a label "customer name" is added, inputs "DENDEN, Taro" in a text box to which a label "customer name (reading)" is added, inputs "XXX@XXX" in a text box to which a label "mail address" is added, inputs "XX-XXXX-XXXX" in a text box to which a label "phone number" is added, inputs "XXX-XXXX" in a text box to which a label "postal code" is added, and inputs "XXX, XX city, XX prefecture" in a text box to which a label "address" is added.

Suppose that as a block usable in the action specification GUI 2212a, a first block corresponding to a logic "start processing when button XXX is clicked", and a second block corresponding to a logic "input character string XXX in text box XXX" are prepared. Note that respective arbitrary values can be set to XXX. At this time, the user can specify the automatic input processing described above by combining one piece of the first block specifying the automatic input button and plural pieces of the second block specifying the respective text boxes through the action specification GUI 2212a.

Furthermore, processing that can be set by the action specifying unit 2212 is not limited to the automatic input processing described above. For example, the action specifying unit 2212 may prepare a block corresponding to a logic "call pulldown enabling to select date selection", or a block corresponding to a logic "call calendar enabling to select date". In this case, the user can set processing to input a selected date in a textbox through the action specification GUI 2212a.

Processing of First Embodiment

Figure 6:
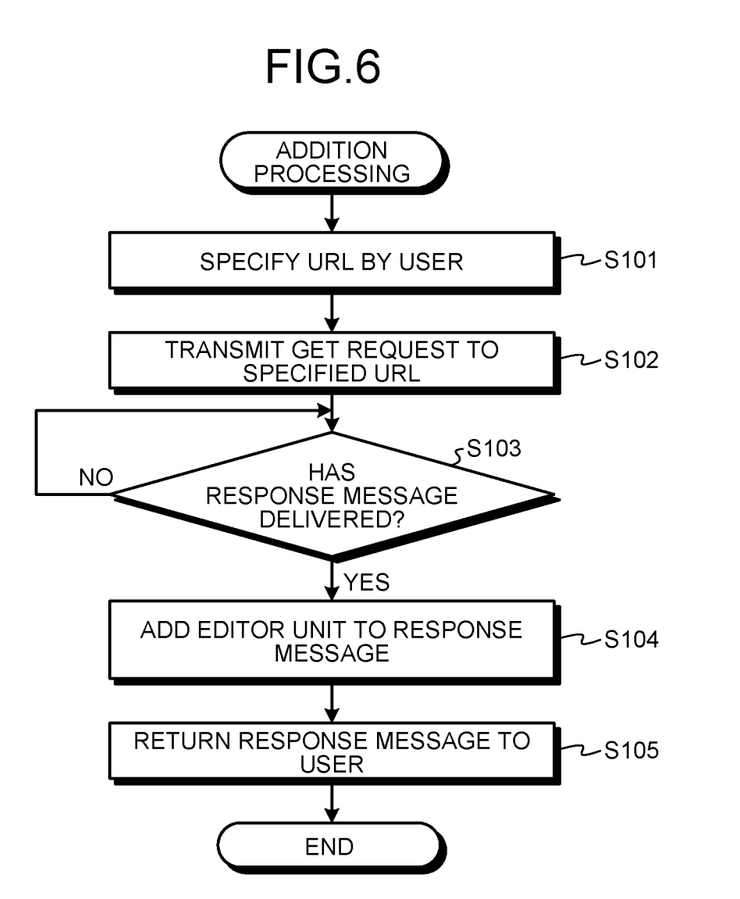
FIG. 6 is a flowchart illustrating a flow of addition processing according to the first embodiment.

Addition processing will be described, using FIG. 6. FIG. 6 is a flowchart illustrating a flow of the addition processing according to the first embodiment. As illustrated in FIG. 6, first, when a URL is specified by a user (step S101), the terminal device 20 transmits a GET request with respect to the specified URL to the web server 10 (step S102). The adding unit 21 waits on standby until a response message from the web server 10 is delivered to the terminal device 20 (step S103: NO).

When the response message from the web server 10 is delivered to the terminal device 20 (step S103: YES), the adding unit 21 adds the editor unit 221 to the response message (step S104), to return to the user (step S105). Specifically, the adding unit 21 returns the response message to which a code of a program that causes the terminal device 20 to perform functions of the part specifying unit 2211 and the action specifying unit 2212 is added, to the web browser 22 operated by the user.

Figure 7:
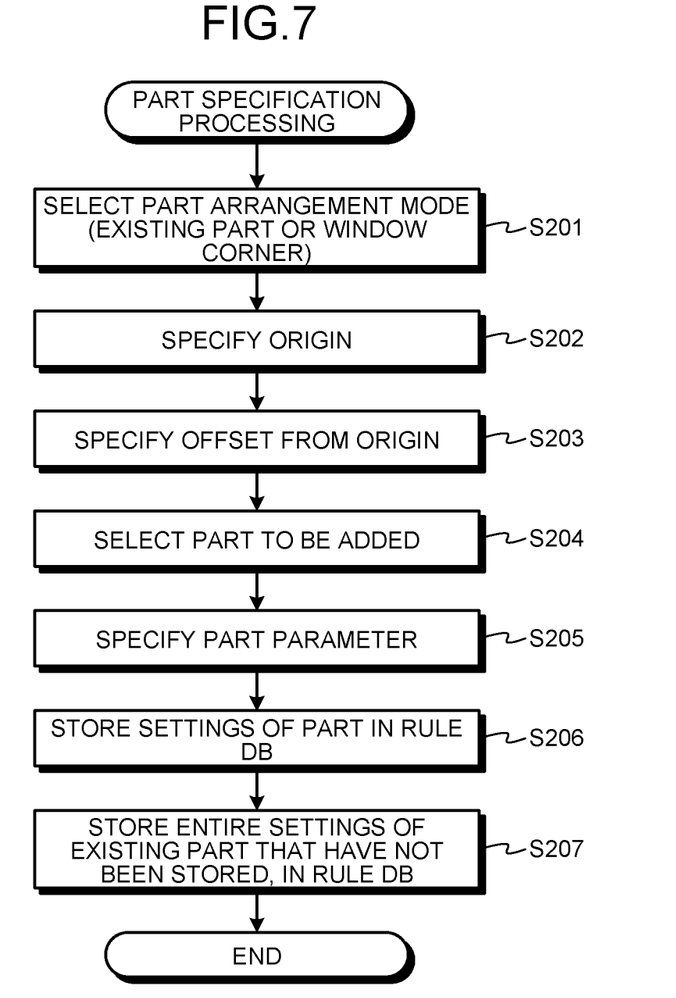
FIG. 7 is a flowchart illustrating a flow of part specification processing according to the first embodiment.

Next, part specification processing will be described, using FIG. 7. FIG. 7 is a flowchart illustrating a flow of the part specification processing according to the first embodiment. As illustrated in FIG. 7, first, the part specifying unit 2211 accepts selection of the part arrangement mode through the part specification GUI 2211a (step S201). For example, a part selection mode is "existing part" or "window corner".

Next, the part specifying unit 2211 accepts specification of an origin through the part specification GUI 2211a (step S202). The part specifying unit 2211 then accepts specification of an offset from the origin through the part specification GUI 2211a (step S203). Subsequently, the part specifying unit 2211 accepts selection of a part to be added through the part specification GUI 2211a (step S204). Furthermore, the part specifying unit 2211 accepts specification of a parameter of the part through the part specification GUI 2211a (step S205).

The part specifying unit 2211 stores respective settings of the added part in the rule DB 23 (step S206). Furthermore, the part specifying unit 2211 stores settings of existing parts that have not been stored, in the rule DB 23 (step S207).

Figure 8:
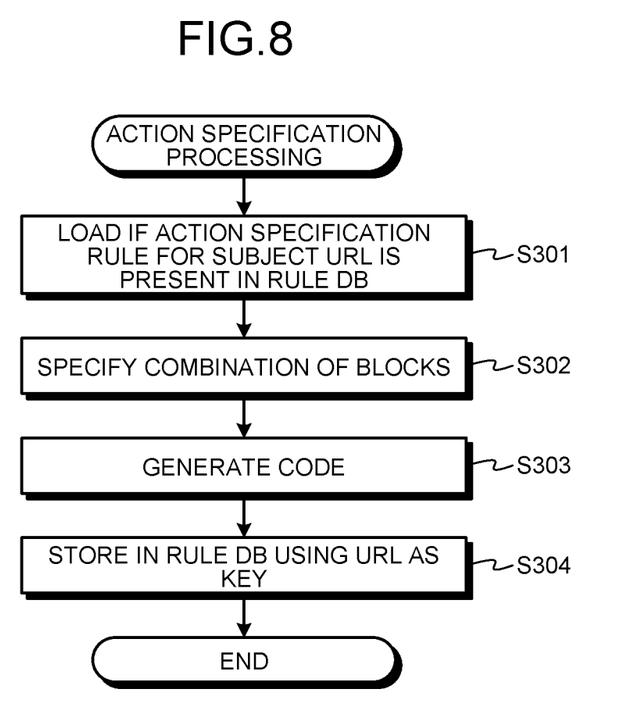
FIG. 8 is a flowchart illustrating a flow of action specification processing according to the first embodiment.

Next, action specification processing will be described, using FIG. 8. FIG. 8 is a flowchart illustrating a flow of the action specification processing according to the first embodiment. As illustrated in FIG. 8, first, the action specifying unit 2212 loads, when an action specification rule for an URL of the subject web page is stored in the rule DB 23, the action specification rule from the rule DB 23 (step S301). The action specification rule is, for example, data expressing a code described in a script language and a combination of blocks in the action specification GUI 2212a, in a predetermined format.

The action specifying unit 2212 accepts specification of a combination of blocks through the action specification GUI 2212a (step S302). The action specifying unit 2212 then generates a code of a program that is described in a script language based on the accepted combination of blocks (step S303), and stores data expressing the generated code and the combination of blocks in a predetermined format in the rule DB 23 using the URL as a key (step S304).

Effects of First Embodiment

The part specifying unit 2211 causes the web browser 22 to display the part specification GUI 2211a that enables specification of settings relating to a display mode of a part constituting a web page, and accepts specification of settings relating to the display mode through the part specification GUI 2211a. Moreover, the action specifying unit 2212 causes the web browser 22 to display the action specification GUI 2212a that enables specification of settings relating to an action of a part constituting the web page, and accepts specification of settings relating to the action through the action specification GUI 2212a. Moreover, the expanding unit 222 expands the web page based on the settings relating to the display mode accepted by the part specifying unit 2211, and on the settings relating to the action accepted by the action specifying unit 2212, and causes the web browser 22 to display the expanded web page. Thus, in the present embodiment, expansion of a UI through a GUI is possible both for a display mode and an action. Therefore, according to the present embodiment, even those not having skills and knowledges about programming can perform works relating to expansion of a UI.

The adding unit 21 acquires a response message transmitted from the web server 10 to the terminal device 20 in response to a request message transmitted from the terminal device 20 to the web server 10, and adds, to the response message, a code of a program to cause the terminal device 20 to perform functions of the part specifying unit 2211 and the action specifying unit 2212. Thus, the functions of the part specifying unit 2211 and the action specifying unit 2212 can be implemented without changing a system providing the web page. Moreover, at this time, it becomes unnecessary to install a new program to use an editor.

The part specifying unit 2211 displays a web page, or a captured image of the web page so as to serve also as background information of arrangement work in an interactive editing operation of a user in the part specification GUI 2211a. Thus, the user is enabled to specify a setting of a display mode of a part, while referring to a UI before expansion and, therefore, works can be done efficiently, and the UI subjected to expansion can be used without causing a sense of incongruity.

The part specifying unit 2211 accepts specification of setting relating to a position, a color, a label, and an annotation of a part constituting a web page. This enables the user to perform expansion of a UI without using the action specification GUI 2212a, if the expansion does not involve addition and change of an action, but by using the part specification GUI 2211a. Therefore, expansion of the UI becomes further easier for the user.

The action specifying unit 2212 displays a GUI that enables specification of settings relating to an action by combining blocks corresponding to predetermined logics, as the action specification GUI 2212a. Thus, the user is enabled to perform addition and change of an action by visually performed operation. Moreover, because it becomes possible to be configured such that a logic having a problem in terms of quality and security is not provided, and that even if a function including it is to be provided, a usage that can cause a problem is excluded by a check function so that such a setting cannot be input, it is possible to prevent a problem from occurring in the web page subjected expansion.

As in the present embodiment, by dividing the editor function to set what is expanded in UI expansion into two aspects of settings relating to a display mode and settings relating to a part action, an editor program that can act independently from each other can be provided. Therefore, there are following advantages in terms of actual business use.

For example, when customization or personalization to specialize settings of the part action to a specific system or work area is conducted, another action-specification editor program can be provided, and a combination with a part specification editor can be varied as necessary to be used properly. In the embodiment, a general editor in a format in which contents that can be described in JavaScript are turned into blocks as they are is described, but by providing an editor that is capable of describing in a language (settings of a dedicated function provided by UI expansion) specialized to a domain of a work area (for example, a facility management system, a customer management system, and the like), efficient use easy to understand for a user is enabled. As a known domain-specific language, a robot control (reference URL: https://en.wikipedia.org/wiki/RoboBlockly), 3D modeling (reference URL: https://makerscad.com/index.html#what), and the like are available, and other cases are also known.

Moreover, the first GUI and the second GUI are not required to be used on the same terminal, and different users can work from different web browsers of different terminals also. Furthermore, it is not necessary to user two GUI screens at the same time, either, and users having different skills can use them at different times and frequency. For example, if a few skilled user proficient in generating a sample of a logic for action specification can provide or release a necessary logic supporting a system subject to application at a frequency of about one month, and a large number of operator users that actually attend to the work can perform appropriate GUI arrangement and detailed settings of UI expansion according to an actual operating screen (make a final definition by using a sample) on the spot when recognizing necessity, it will bring a great advantage in actual use.

Note that a benefit for a user aimed in the present invention is a UI expansion system, but there also are many requests wishing to use it as an annotation system in a simplified manner in an actual work scene. To such a user need, a minimum configuration according to the use can be provided, such that only the part specifying unit is provided, and the action specifying unit is not used, or the action specifying unit that provides only very simple actions as a default is mounted separately, or the like. By functionally separating part specification and arrangement specification, when improvement of software quality of a common function (part arrangement function) or advancement of implementation method is conducted, it is possible to make use of the advantage of those at the same time in multiple solutions.

Another Embodiment

In the first embodiment, the rule DB 23 stores a URL itself, but it may be a regular expression that matches with a character string of the URL, or information arbitrarily associated with the URL by a user in the rule DB 23. Thus, the terminal device 20 can use settings set in the editor unit 221 for expansion of multiple similar web pages.

Configuration of System, etc.

Moreover, the illustrated respective components of the respective devices are of functional concept, and it is not necessarily required to be configured physically as illustrated. That is, specific forms of distribution and integration of the respective devices are not limited to the ones illustrated, and all or a part thereof can be configured to be distributed or integrated functionally or physically in arbitrary units according to various kinds of loads, usage conditions, and the like. For example, the terminal device can display either one or both of the first GUI and the second GUI on a client application, not on the web browser. In this case, although installation of a new program to use the editor is necessary, restrictions in an interactive function with a user on the web browser are eliminated and, therefore, the usability can be improved. Furthermore, as for the respective processing functions performed by the respective devices, all or an arbitrary part thereof can be implemented by a CPU and a computer program that is analyzed and executed by the CPU, or can be implemented as hardware by wired logic.

Moreover, all or a part of the processing described as to be performed automatically out of the respective processing described in the above embodiments can be performed manually also, while all or a part of the processing described as to be performed manually can be performed automatically also by a publicly-known method. In addition, the processing procedures, the control procedures, the specific names, and the information including various kinds of data and parameters indicated in the above document and the drawings can be arbitrarily modified unless otherwise specified.

[Program]

As one embodiment, the terminal device 20 can implement a UI expansion program to perform the UI expansion described above as package software or online software by installing it on a desired computer. For example, by causing an information processing apparatus to execute the above UI expansion program, it is possible to make the information processing apparatus function as the terminal device 20. The information processing apparatus herein includes a desktop or a laptop personal computer. Moreover, in addition thereto, as the information processing apparatus, a mobile communication terminal, such as a smartphone, a mobile phone, and a personal handy phone system (PHS), and a slate terminal, such as a personal digital assistants (PDA) are included in the category.

Furthermore, regarding a terminal device used by a user as a client, the terminal device 20 can be implemented as a UI expansion server device that provides services relating to the UI expansion described above to the client. For example, the UI expansion server device is implemented as a server device that provides a UI expansion service in which a request message is input, and a response message to which an editor unit is added is output. In this case, the UI expansion server device may be implemented as a web server, or may be implemented as a cloud that provides a service relating to the above UI expansion by outsourcing.

Figure 9:
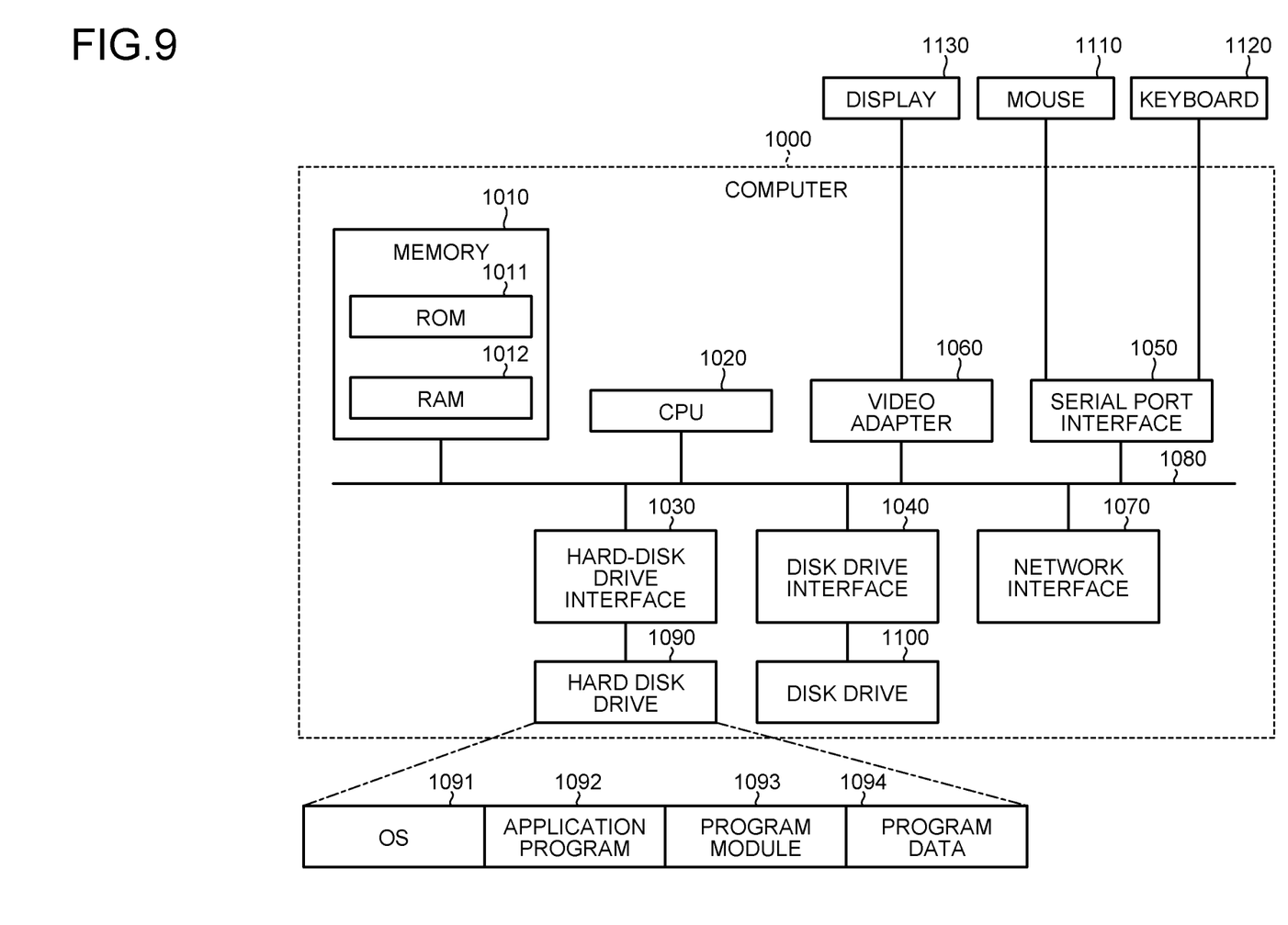
FIG. 9 is an illustration of an example of a computer that executes a UI expansion program.

FIG. 9 is an illustration of an example of a computer that executes the UI expansion program. A computer 1000 includes, for example, a memory 1010 and a CPU 1020. Moreover, the computer 1000 includes a hard-disk drive interface 1030, a disk drive interface 1040, a serial port interface 1050, a video adaptor 1060, and a network interface 1070. These respective parts are connected through a bus 1080.

The memory 1010 includes a read only memory (ROM) 1011 and a random access memory (RAM) 1012. The ROM 1011 stores a boot program, such as basic input output system (BIOS). The hard-disk drive interface 1030 is connected to a hard disk drive 1090. The disk drive interface 1040 is connected to a disk drive 1100. For example, a detachable storage medium, such as a magnetic disk and an optical disk, is inserted in the disk drive 1100. The serial port interface 1050 is connected, for example, to a mouse 1110 and a keyboard 1120. The video adapter 1060 is connected to, for example a display 1130.

The hard disk drive 1090 stores, for example, an OS 1091, an application program 1092, a program module 1093, and program data 1094. That is, the program defining the respective processing of the terminal device 20 is implemented as the program module 1093 in which computer-executable codes are described. The program module 1093 is stored, for example, in the hard disk drive 1090. For example, the program module 1093 to perform processing similar to that of the functional configuration in the terminal device 20 is stored in the hard disk drive 1090. Note that the hard disk drive 1090 may be substituted for an SSD.

Furthermore, setting data used in the processing in the embodiment described above is stored, for example, in the memory 1010 or the hard disk drive 1090 as the program data 1094. The CPU 1020 reads the program module 1093 and the program data 1094 stored in the memory 1010 or the hard disk drive 1090 as necessary to the RAM 1012, and executes it.

The program module 1093 and the program data 1094 are not limited to be stored in the hard disk drive 1090, but may be stored, for example, in a detachable storage medium and read by the CPU 1020 through the disk drive 1100, or the like. Alternatively, the program module 1093 and the program data 1094 may be stored in another computer connected through a network (local area network (LAN), wide area network (WAN), and the like), and the program module 1093 and the program data 1094 may be read by the CPU 1020 through the network interface 1070 from the other computer.

REFERENCE SIGNS LIST

10 WEB SERVER
20 TERMINAL DEVICE
21 ADDING UNIT
22 WEB BROWSER
23 RULE DB
24 PROXY UNIT
221 EDITOR UNIT
222 EXPANDING UNIT
2211 PART SPECIFYING UNIT

2211a PART SPECIFICATION GUI
2212 ACTION SPECIFYING UNIT

The invention claimed is:

1. A terminal device comprising:
a memory; and
a processor coupled to the memory and programmed to execute a process comprising:
firstly causing the terminal device to display a first graphical user interface (GUI) that enables to specify settings relating to a display mode of a part constituting a web page, and firstly accepting specification of settings relating to the display mode through the first GUI;
secondly causing the terminal device to display a second GUI that enables to specify settings relating to an action of a part constituting the web page, and secondly accepting specification of settings relating to the action through the second GUI;
expanding the web page based on the settings relating to the display mode accepted by the firstly accepting, and the settings relating to the action accepted by the secondly accepting, and thirdly causing the terminal device to display the expanded web page; and
acquiring a response message transmitted from a web server to the terminal device in response to a request message transmitted from the terminal device to the web server, and adding a code of a program to cause the terminal device to perform a function of the firstly causing and the secondly causing, to the response message.

2. The terminal device according to claim 1, wherein
the firstly causing causes the terminal device to display the first GUI on a web browser,
the secondly causing causes the terminal device to display the second GUI on a web browser, and
the thirdly causing causes the terminal device to display the web page on a web browser.

3. The terminal device according to claim 1, wherein
the firstly causing causes the terminal device to display any one of the web page and a captured image of the web page, so as to serve also as background information of arrangement work in an interactive editing operation of a user in the first GUI.

4. The terminal device according to claim 1, wherein
the firstly accepting accepts specification of settings relating to a position, a color, a label, and an annotation of a part constituting the web page.

5. The terminal device according to claim 1, wherein
the secondly causing cause to display a GUI that enables to specify settings relating to the action by combining blocks corresponding to predetermined logics, as the second GUI.

6. A UI expansion method that is performed by a terminal device, comprising:
causing the terminal device to display a first graphical user interface (GUI) that enables to specify settings relating to a display mode of a part constituting a web page, and firstly accepting specification of settings relating to the display mode through the first GUI;
causing the terminal device to display a second GUI that enables to specify settings relating to an action of a part constituting the web page, and secondly accepting specification of settings relating to the action through the second GUI;
expanding the web page based on the settings relating to the display mode accepted by the firstly accepting, and the settings relating to the action accepted by the secondly accepting, and causing the terminal device to display the expanded web page; and
acquiring a response message transmitted from a web server to the terminal device in response to a request message transmitted from the terminal device to the web server, and adding a code of a program to cause the terminal device to perform a function of the firstly causing and the secondly causing, to the response message.

7. A non-transitory computer-readable recording medium having stored therein a program, for expanding UI, that causes a computer to execute a process comprising:
causing the terminal device to display a first graphical user interface (GUI) that enables to specify settings relating to a display mode of a part constituting a web page, and firstly accepting specification of settings relating to the display mode through the first GUI;
causing the terminal device to display a second GUI that enables to specify settings relating to an action of a part constituting the web page, and secondly accepting specification of settings relating to the action through the second GUI;
expanding the web page based on the settings relating to the display mode accepted by the firstly accepting, and the settings relating to the action accepted by the secondly accepting, and causing the terminal device to display the expanded web page; and
acquiring a response message transmitted from a web server to the terminal device in response to a request message transmitted from the terminal device to the web server, and adding a code of a program to cause the terminal device to perform a function of the firstly causing and the secondly causing, to the response message.

* * * * *